(12) United States Patent (10) Patent No.: US 9,292,304 B2
Wecker (45) Date of Patent: Mar. 22, 2016

(54) LANGUAGE INTEGRATION VIA FUNCTION REDIRECTION

(75) Inventor: David B. Wecker, Redmond, WA (US)

(73) Assignee: MICROSOFT CORPORATION, Redmond, WA (US)

( * ) Notice: Subject to any disclaimer, the term of this patent is extended or adjusted under 35 U.S.C. 154(b) by 103 days.

(21) Appl. No.: 13/589,719

(22) Filed: Aug. 20, 2012

(65) Prior Publication Data

US 2014/0053132 A1 Feb. 20, 2014

(51) Int. Cl.
*G06F 9/45* (2006.01)
*G06F 9/44* (2006.01)

(52) U.S. Cl.
CPC ..................... *G06F 9/443* (2013.01)

(58) Field of Classification Search
CPC ............... G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | | |
|---|---|---|---|---|
| 4,916,610 | A * | 4/1990 | Bapat | 717/141 |
| 2002/0199108 | A1* | 12/2002 | Chuang et al. | 713/176 |
| 2003/0121028 | A1* | 6/2003 | Coury et al. | 717/138 |
| 2008/0168421 | A1* | 7/2008 | Meijer et al. | 717/106 |
| 2009/0241090 | A1* | 9/2009 | Anlauff | G06F 8/42 717/114 |
| 2009/0328016 | A1 | 12/2009 | Ng et al. | |
| 2010/0114885 | A1 | 5/2010 | Bowers et al. | |
| 2012/0297369 | A1* | 11/2012 | Costa | 717/126 |

OTHER PUBLICATIONS

Jonathan James Grattage, A functional quantum programming language.*
JSPatterns, http://www.jspatterns.com/returning-functions/.*
JSPatterns, http://www.jspatterns.com/return-functions.*
Maity et al., Design of an Efficient Quantum Circuit Simulator, 2010.*
Dhand, database query writing paradigm shift through language integrated query system in a trust based framework for web services authorization control, 2012.*
JSPatterns.com, 2009.*
Zavala et al., A Simulation of a Virtual Qubits on a Classical Computer has been Developed Recently, 2011.*
Zavala et al., A Simulation of a Virtual Qubits on a Classical Computer, 2010.*
Bertoni et al., Numerical simulation of quantum logic gates based on quantum wires, 2000.*
Syme, Don., "Leveraging .NET Meta-Programming Components from F# Integrated Queries and Interoperable Heterogeneous Execution", Retrieved at <<http://research.microsoft.com/pubs/147193/heterogeneous-execution.pdf>>, Proceeding: ACM Workshop on ML, 2006, Sep. 16, 2006, pp. 43-54.
Garcia, et al., "Extending Scala with Database Query Capability", Retrieved at <<http://www.sts.tu-harburg.de/people/mi.garcia/ScalaQL/ScalaQLpreprint.pdf>>, Proceeding: Journal of Object Technology, vol. 9, No. 4, Jul. 2010, pp. 45-68.

(Continued)

*Primary Examiner* — Wei Zhen
*Assistant Examiner* — Zhan Chen
(74) *Attorney, Agent, or Firm* — Steve Wight; Sandy Swain; Micky Minhas

(57) ABSTRACT

Systems and methods for language integration via function redirection are disclosed herein in connection with simulation of quantum computations on classical computers. A base class that all of the functions of a group will instantiate in their context may be defined. The functions may take arguments that may be passed to a member of the base class for dispatch. A dispatcher may be provided to analyze the current context. The dispatcher may perform any of a number of operations as a result, including, but not limited to, passing the arguments to the class instance for execution, returning the class instance directly or via a context holder, returning a new representation of the function for future execution via a context holder, or any other return type that may be desired.

20 Claims, 3 Drawing Sheets

(56) References Cited

OTHER PUBLICATIONS

Reichle, et al., "A Context Query Language for Pervasive Computing Environments", Retrieved at <<http://ieeexplore.ieee.org/stamp/stamp.jsp?tp=&arnumber=4517434>>, Proceeding: Sixth Annual IEEE International Conference on Pervasive Computing and Communications, Mar. 17, 2008, pp. 434-440.

Box, et al., "LINQ: .NET Language-Integrated Query", Retrieved at <<http://grail.csuohio.edu/~matos/notes/cis-612/TechTopics/LINQ%20NET%20Language-Integrated%20Query.pdf>>, Feb. 2007, pp. 1-27.

Kulkarni, et al., "LINQ to SQL: .NET Language-Integrated Query for Relational Data", Retrieved at <<http://msdn.microsoft.com/en-us/library/bb425822.aspx>>, Mar. 2007, pp. 100.

Torgersen, Mads., "Language Integrated Query Unified Querying across Data Sources and Programming Languages", Retrieved at <<http://www-vs.informatik.uni-ulm.de/DE/intra/bib/2006/OOPSLA-GPCE/oopsla/p736.pdf>>, Oct. 22, 2006, pp. 736-737.

\* cited by examiner

LANGUAGE INTEGRATION VIA FUNCTION REDIRECTION

BACKGROUND

It may be desirable for a function call in a programming language to produce different results based on its execution context. For example, calling the same function, even with the same arguments, may result in performance of a certain operation, return of meta-information about the function, generation of a description that would allow the function to be performed at a later time, or the like.

One known approach for resolving which result is desired based on context is Language Integrated Queries (known as LINQ). In known approaches, such as LINQ, functions typically cannot be directly compiled and run. Consequently, there is a loss of performance. Also, complicated parsers often need to be written. And the data types on which the function operates usually need to fall within a specific class.

It would be desirable, therefore, if there were available systems and methods for resolving the desired result of a function call, based on context, where the function may be directly compiled and run, complicated parsers do not need to be written, and the data types operated upon do not need to fall within a specific class.

SUMMARY

Systems and methods for language integration via function redirection are disclosed herein in connection with simulation of quantum computations on classical computers. As described herein, a base class (or type) that all of the functions of a group will instantiate in their context may be defined. The functions may take arguments that may be passed to a member of the base class for dispatch. A dispatcher may be provided to analyze the current context (e.g., global, or passed via the arguments). The dispatcher may perform any of a number of operations as a result, including, but not limited to, passing the arguments to the class instance for execution, returning the class instance directly or via a context holder, returning a new representation of the function for future execution via a context holder, or any other return type that may be desired.

Such systems and methods may have several useful aspects. For example, functions that are written as described herein appear to be "normal" to the user, and do not need to be viewed in any special way. Invisible overloading of various functions, which may or may not be related to the original function, may be achieved. The amount of work required by a programmer to implement such an approach may be fairly low. And contextual execution provides a way to gain flexibility without added overhead. Such an approach may also fit well into Functional Programming models, without violating any of the "core assumptions" that such models typically espouse.

DETAILED DESCRIPTION OF THE ILLUSTRATIVE EMBODIMENTS

Example Computing Environment

Figure 1:
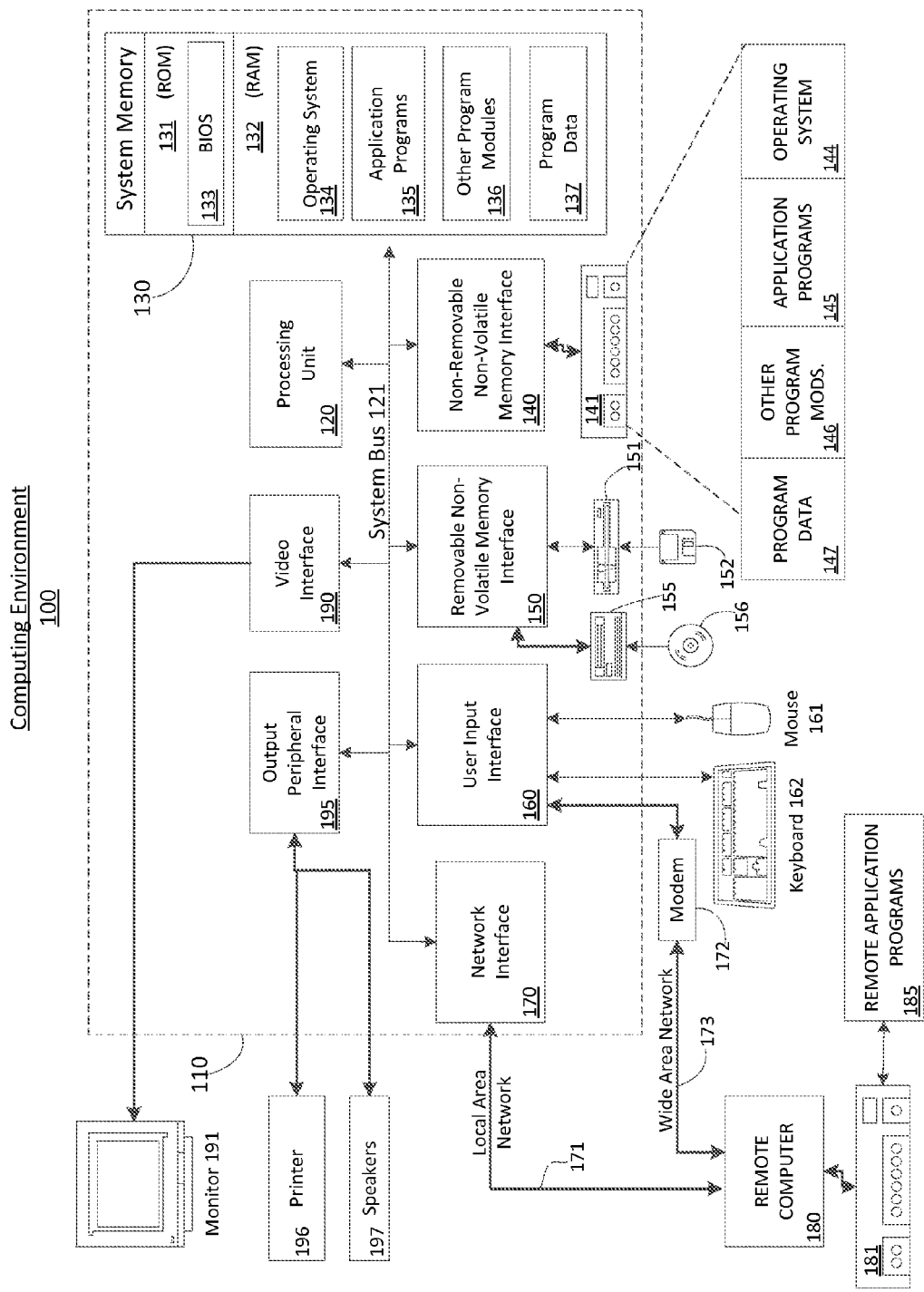
FIG. 1 is a block diagram showing an exemplary computing environment in which aspects of the invention may be implemented.

FIG. 1 shows an example computing environment in which example embodiments and aspects may be implemented. The computing environment 100 is only one example of a suitable computing environment and is not intended to suggest any limitation as to the scope of use or functionality. Neither should the computing environment 100 be interpreted as having any dependency or requirement relating to any one or combination of components illustrated in the example operating environment 100.

Numerous other general purpose or special purpose computing system environments or configurations may be used. Examples of well-known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an example system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144 application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are example and other means of establishing a communications link between the computers may be used.

Language Integration Via Function Redirection

Figure 2:
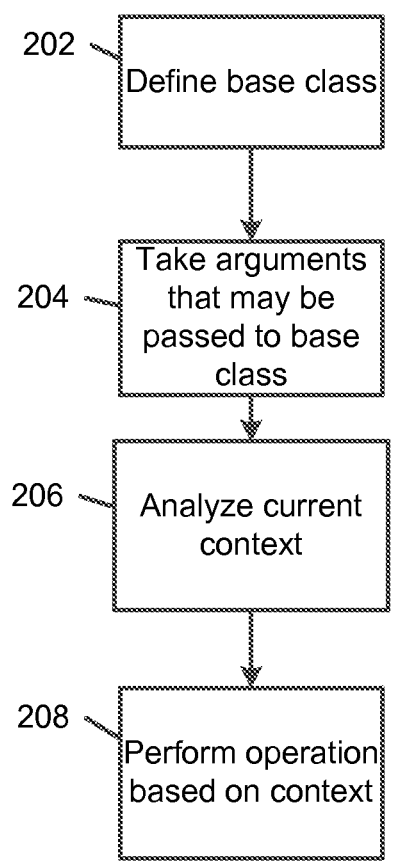
FIG. 2 is a flowchart of a method for providing language integration via function redirection.

FIG. 2 is a flowchart of a method 200 for providing language integration via function redirection. At 202, a base class (or type) may be defined such that all the functions of a group instantiate the base class in their context. At 204, the functions may take arguments that may be passed to a member of the base class for dispatch.

At 206, a dispatcher may be provided to analyze the current context, which may be global or passed via the arguments. At 208, the dispatcher may perform any of a number of operations as a result. Examples of such operations include, but are not limited to, passing the arguments to the class instance for execution, returning the class instance directly or via a context holder, or returning a new representation of the function for future execution via a context holder, or any other return type that may be desired.

The method 200 may be illustrated with reference to a quantum simulator (i.e., a simulator for simulating quantum computations on classical computers). Such a simulator may define "gate" operations. Accordingly, the base class may be a Gate, and may contain any number of data fields, e.g.,

```
Gate (Name:string, Qubits:int, Mat:CSMat, Render:Render list,
    Help:string, Op:GateOp, Child:Gate option).
```

The Gate function itself may be handed a set of Qubits on which to perform an operation. For example, a Z gate may be defined as:

```
let Z (qs:Qubits) =
    let gate =
        new Gate(
            Name = "Z",
            Help = "Pauli Z flip",
            Render = [Box("Z")],
            Mat = CSMat(2,[(0,0,1.,0.);(1,1,−1.,0.)])
        )
    gate.Run qs.
```

Here, the function (Z) is given a set of Qubits (qs) and then calls the gate dispatcher function (gate.Run) on the Qubits. The gate dispatcher looks at the current context (held within the Qubits) and decides to do one of several things, based on context.

In a first context, the gate dispatcher may decide to execute the Gate. In this case, the matrix (Mat) may be used to operate on the Qubits and alter their state, thereby performing a quantum simulation. In a second context, the gate dispatcher may decide to return the Gate itself, so that other gates may access the internal fields (Name, Help, Render, Mat, . . . ). In a third context, the gate dispatcher may decide to return a description of the gate (Circuit) that may be used for analysis, optimization, drawing, deferred execution, or the like.

To run the gate (i.e., the first context), the user can just type "Z qs," where qs is a set of Qubits. If the mode of the Qubits is set to "Gate mode" (i.e., the second context), then the same instruction would return the Gate inside of the function. If the mode of the Qubits is set to "Circuit mode" (i.e., the third context), then the same instruction would return the Circuit instantiation of the function. Indeed, one can build very large nested functions of Gates that when called in one mode run the operation, while when called in another return a data structure (Circuit) that can be used in a myriad of ways (including delayed execution of all the functions).

Figure 3:
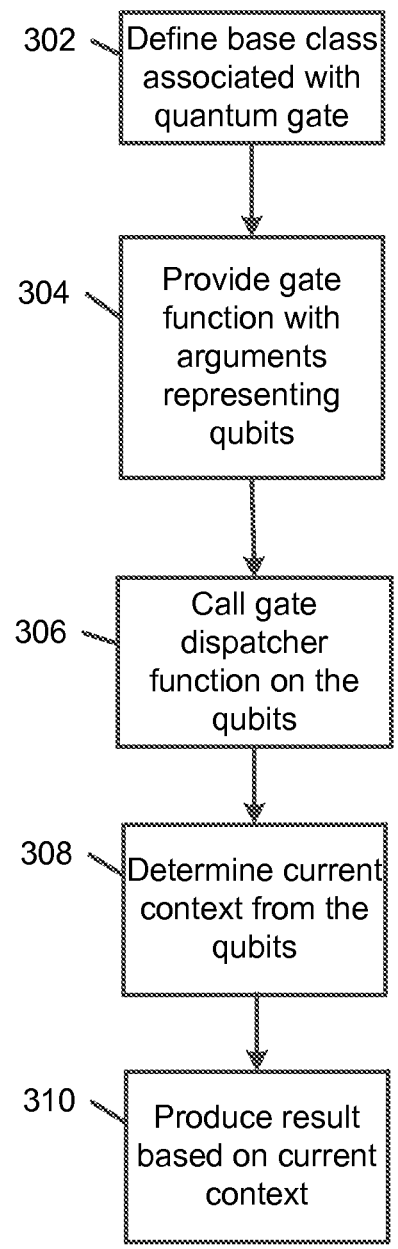
FIG. 3 is a flowchart of an example embodiment of a method for providing language integration via function redirection for quantum simulation on a classical computer.

FIG. 3 is a flowchart of an example embodiment of a method 300 for providing language integration via function redirection for quantum simulation on a classical computer. As shown in FIG. 3, a base class associated with a quantum gate may be defined at 302. At 304, a gate function may be provided with one or more arguments representing a set of qubits on which to perform an operation.

At 306, a gate dispatcher function may be called on the qubits. At 308, the gate dispatcher may determine a current context from the qubits. The gate dispatcher produces a result, at 310, based on the current context. The result may be to execute the gate, to return the gate itself, or to return a description of the gate, for example.

By contrast, the traditional (object oriented) approach is to put the class (Gate) on the outside and the function on the inside (as a method). Consequently, the three modes are now either explicit, i.e.:
Z.Run qs
Z.Gate qs
Z.Circuit qs
or a dispatcher routine is still created, but needs to be called explicitly (e.g., Z.Run qs). Either of these modes makes the user aware of the Gate class explicitly and provides a non-intuitive API. Using the approach described herein, many operations may be called seamlessly (X qs; Y qs; Z qs . . . ). Without it, the user would have to call the dispatcher directly every time (X.Run qs; Y.Run qs. Z.Run qs). Without the dispatcher (i.e., using the traditional method described above), there is no way to use the same calls to produce more than one result.

What is claimed is:

1. A method for providing language integration via function redirection for quantum simulation on a computer, the method comprising:
    defining a base class associated with a quantum gate;
    providing a gate function with one or more arguments representing a set of qubits on which to perform an operation;
    calling a gate dispatcher function;
    determining a context of the qubits;
    returning the gate when the context of the qubits is set to gate mode; and
    returning a circuit when the context of the qubits is set to circuit mode.

2. The method of claim 1, wherein the gate dispatcher executes the gate.

3. The method of claim 2, wherein executing the gate includes operating on the qubits to alter their state.

4. The method of claim 1, wherein the gate dispatcher returns the gate itself.

5. The method of claim 4, wherein the gate dispatcher returns the gate so that other gates may access internal fields associated with the returned gate.

6. The method of claim 1, wherein the gate dispatcher returns a description of the gate.

7. The method of claim 6, wherein the description of the gate is a circuit.

8. The method of claim 6, wherein the description of the gate is used for analysis, optimization, drawing, or deferred execution.

9. A device comprising:
    a processor; and
    executable instructions operable by the processor, the executable instructions comprising a method for providing language integration via function redirection for quantum simulation, the method comprising:
        defining a base class associated with a quantum gate;
        providing a gate function with one or more arguments representing a set of qubits on which to perform an operation;
        calling a gate dispatcher function;
        determining a context of the qubits;
        returning the gate when the context of the qubits is set to gate mode; and
        returning a circuit when the context of the qubits is set to circuit mode.

10. The device of claim 9, wherein the gate dispatcher executes the gate.

11. The device of claim 10, wherein executing the gate includes operating on the qubits to alter their state.

12. The device of claim 9, wherein the gate dispatcher returns the gate itself.

13. The device of claim 9, wherein the gate dispatcher returns a description of the gate.

14. The device of claim 13, wherein the description of the gate is a circuit.

15. An apparatus comprising:
    at least one network interface;
    a memory storing processor-executable instructions; and a processor operatively coupled to the at least one network interface and the memory, wherein upon execution of the processor-executable instructions, the processor:
defines a base class associated with a quantum gate;
provides a gate function with one or more arguments representing a set of qubits on which to perform an operation;
calls a gate dispatcher function;
determines a context of the qubits;
returns the gate when the context of the qubits is set to gate mode; and
returns a circuit when the context of the qubits is set to circuit mode.

16. The apparatus of claim 15, wherein the gate dispatcher executes the gate.

17. The apparatus of claim 16, wherein executing the gate includes operating on the qubits to alter their state.

18. The apparatus of claim 15, wherein the gate dispatcher returns the gate itself.

19. The apparatus of claim 15, wherein the gate dispatcher returns a description of the gate.

20. The apparatus of claim 19, wherein the description of the gate is a circuit.

* * * * *